(12) United States Patent
Karr et al.

(10) Patent No.: US 7,636,814 B1
(45) Date of Patent: Dec. 22, 2009

(54) SYSTEM AND METHOD FOR ASYNCHRONOUS READS OF OLD DATA BLOCKS UPDATED THROUGH A WRITE-BACK CACHE

(75) Inventors: Ronald S. Karr, Palo Alto, CA (US); Craig Harmer, San Francisco, CA (US)

(73) Assignee: Symantec Operating Corporation, Mountain View, CA (US)

( * ) Notice: Subject to any disclaimer, the term of this patent is extended or adjusted under 35 U.S.C. 154(b) by 296 days.

(21) Appl. No.: 11/117,268

(22) Filed: Apr. 28, 2005

(51) Int. Cl.
*G06F 12/12* (2006.01)
(52) U.S. Cl. .................................................. 711/143
(58) Field of Classification Search .................. 711/143
See application file for complete search history.

(56) References Cited

U.S. PATENT DOCUMENTS

| | | | |
|---|---|---|---|
| 5,542,066 A * | 7/1996 | Mattson et al. ............. | 711/136 |
| 5,600,817 A | 2/1997 | Macon, Jr. et al. | |
| 5,636,355 A | 6/1997 | Ramakrishnan et al. | |
| 6,073,222 A * | 6/2000 | Ohran ........................ | 711/162 |
| 6,243,795 B1 | 6/2001 | Yang et al. | |
| 6,549,977 B1 | 4/2003 | Horst et al. | |
| 6,795,894 B1 | 9/2004 | Neufeld et al. | |
| 6,912,687 B1 | 6/2005 | Gates et al. | |

\* cited by examiner

*Primary Examiner*—Reginald G Bragdon
*Assistant Examiner*—Eric Loonan
(74) *Attorney, Agent, or Firm*—Meyertons, Hood, Kivlin, Kowert & Goetzel, P.C.; B. Noel Kivlin

(57) ABSTRACT

A system for asynchronous reads of old data blocks updated through a write-back cache includes a storage device, a write-back cache, a storage consumer, a storage processing node, and device management software. The device management software may be configured to store a new version of a data block in the write-back cache in response to an update request from the first storage consumer and to then send an update completion notification to the first storage consumer. Some time after the update completion notification has been sent, the device management software may be configured to send a previous version of the updated data block to the storage processing node, where it may be required to perform an operation such as a copy-on write operation or a snapshot update.

35 Claims, 10 Drawing Sheets

SYSTEM AND METHOD FOR ASYNCHRONOUS READS OF OLD DATA BLOCKS UPDATED THROUGH A WRITE-BACK CACHE

BACKGROUND OF THE INVENTION

1. Field of the Invention

This invention relates to computer systems and, more particularly, to the management of updates within storage environments employing write-back caches.

2. Description of the Related Art

Many business organizations and governmental entities rely upon applications that access large amounts of data, often exceeding a terabyte or more of data, for mission-critical applications. Often such data is stored on many different storage devices, which may be heterogeneous in nature, including many different types of devices from many different manufacturers. In such storage environments, various storage devices may be configured with associated write-back caches to reduce the latency for update operations as seen by the requesting applications.

A write-back cache may be implemented using memory technology that supports efficient write operations (e.g., various kinds of Random Access Memory or RAM), especially when compared to the latencies associated with committing updates to an underlying storage device such as a disk. In many environments, a non-volatile write-back cache may be employed, e.g., using battery-backed RAM, so that data stored within the cache is recoverable in the event of certain kinds of failures, even if it has not been written to underlying storage. When an application requests that a given block of data within a storage device equipped with a write-back cache be updated, the updated or new version of the data may be stored within the write-back cache. For many kinds of write operations and for various storage devices, an indication that the write operation has completed may be provided to the requesting application as soon as the new version of the data block is written to the write-back cache, instead of waiting until the underlying storage device is updated. Subsequently, for example when the proportion of "dirty" data in the write-back cache (i.e., updated data that has not been committed to the underlying storage device) may be close to a specified threshold level, updated versions of data blocks temporarily stored in the write-back cache may be written to the underlying storage devices.

For some storage devices that support storage operations such as copy-on-write snapshots, however, the previous version of a data block being updated may be needed at a storage processing node other than the data consumer requesting the update, before the previous version is overwritten with the new version. The storage processing node may be any software or hardware entity, such as a physical or logical device, a thread or process, a module, a host or a server, where the previous version of the data block may be needed to perform a particular storage-related function. Storage processing nodes may be linked to the storage device, e.g., over a network, and may include, for example, other storage consumers, other storage devices, or metadata servers such as a volume server in a distributed virtualization environment The previous version of a data block from one node of a distributed storage system may be required, for example, to complete a copy-on-write operation for a snapshot being maintained at another node of the distributed storage system. Similarly, in a distributed virtual RAID device, a previous version of a data block at one node of the device (and the previous version of a corresponding parity block) may be required to compute a new version of the parity block at another node of the device.

In order to prevent an unintended loss of the old version due to an overwrite, the previous version may typically be provided to the storage processing node prior to writing the new version of the data in the write-back cache in such storage environments. In some cases, an acknowledgment may also be required from the storage processing node indicating that the previous version has been received and acted on appropriately (e.g., that the processing that required the previous version of the data block has been completed, or at least that the previous version is no longer required). In many cases, especially when the write-back cache may be relatively small compared with the total amount of data being managed within the storage device, or (as is often the case) the cache prioritizes writes over reads, the previous version of the data block will not be within the cache of the storage device and will have to be read from the underlying backing storage device and delivered to the storage processing node (which may require transmission over a network). The latency of reading a data block from the backing storage device may itself be comparable to the latency of writing a data block to the backing storage device. Any additional processing or delay involved in sending the previous version to the second consumer, and receiving any required acknowledgments, may further extend the time taken to complete the requested update, as seen by the data consumer. Such a synchronous read of a previous version of a data block during an update (i.e., reading a previous version of a data block prior to notifying an updating storage consumer that a requested update has completed) may thus result in a substantial update latency penalty to the updating consumer. For example, the latency of writing into a RAM cache may be replaced by the latency of a read from disk followed by a write to the RAM cache, and potentially additional latencies associated with intervening operations such as reading parity or updating a log. The end-user or application requesting the update may be unaware that a previous version of the data block being updated is required elsewhere, which may add further to the perceived latency penalty. In such environments, it may be desirable to develop a technique that reduces data block update latency as seen by an updating storage consumer.

SUMMARY OF THE INVENTION

Various embodiments of a system and method for asynchronous reads of old data blocks updated through a write-back cache are disclosed. According to a first embodiment, a system may include a storage device, a write-back cache, a storage consumer, a storage processing node and device management software. The storage device may be a physical storage device such as a disk or a disk array, or it may be a virtual storage device such as a file system, a logical volume, or an object storage device. The storage processing node may be any software or hardware entity where the previous version of the data block may be needed to perform a particular storage-related function. The device management software may be configured to store a new version of a data block in the write-back cache in response to an update request from the storage consumer and to then send an update completion notification to the storage consumer. Some time after the update completion notification has been sent, the device management software may be configured to send a previous version of the updated data block to the storage processing node, where it may be needed in order to perform an operation such as a copy-on write operation for a snapshot update. By providing the previous version to the second storage consumer asynchronously with respect to the update request, the device management software may help to reduce the update latency seen at the storage consumer. After the previous version is sent to the storage processing node, and after processing based on the previous version has completed, the device management software may write the updated data block to a backing storage device, overwriting the previous version.

In a second embodiment, a system may include a first and a second storage server, wherein each storage server includes a respective write-back cache and a respective backing storage device, a virtual device server and a storage consumer. The virtual device server may be configured to aggregate storage within the first and second storage servers may as a distributed virtual storage device using redundancy for high availability. That is, an update operation requested by the storage consumer may require redundancy information to be computed using at least a previous version of a first data block (stored at the first storage server) and a previous version of a second data block (stored at the second storage server). In response to a request from the data consumer to update the first data block (where the request includes a new version of the first data block), the first storage server may be configured to store the new version of the first data block in its write-back cache and send an update completion notification to the data consumer. Later, prior to replacing the previous version of the first data block at its backing storage device, the first storage server may be configured to send a copy of the previous version of the first data block to the second storage server. The redundancy computation may then be performed at the second storage server.

In one particular embodiment, the distributed virtual storage device may be a virtual RAID device: that is, the redundancy computation may be a RAID parity computation, and the second data block may be a parity block. The write back caches at the first and second storage servers may be non-volatile caches in such an embodiment. In addition to sending the update request to the first storage server, the data consumer may also be configured to send a parity update request, also including the new version of the first data block, to the second storage server. The second storage server may be configured to respond to the parity update request by storing the new version of the first data block in its write-back cache and sending a parity update completion notification to the data consumer. Later, and asynchronously with respect to the parity update request, the second storage server may derive a new version of the parity block (i.e., the second data block) using the previous versions of the first data block and the second data block and the new version of the first data block, e.g., by a series of XOR operations.

Figure 1:
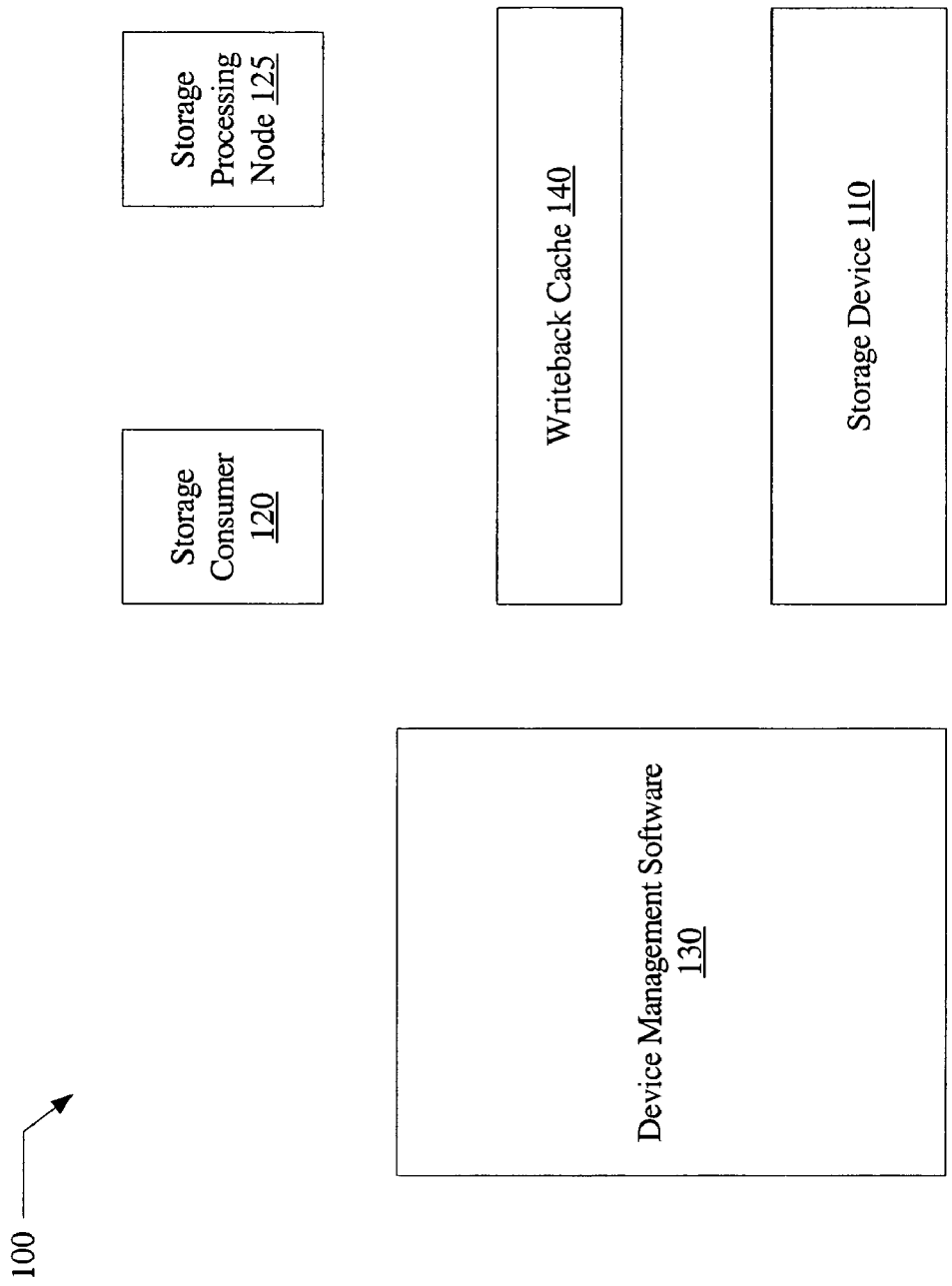
FIG. 1 is a block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a storage system 100 according to one embodiment. In the illustrated embodiment, system 100 includes a storage device 110 with a write-back cache 140, device management software 130, storage consumer 120 and storage processing node 125.

In general, a write-back cache, such as cache 140, may be any efficient front-end memory storage area for a corresponding back-end storage device such as a disk or a disk array, where a data block updated by a storage consumer (e.g., 120) may be temporarily stored before being written to the back-end storage device. The back-end storage device, which may also be termed a backing storage device, may contain the physical data corresponding to one or more logical storage devices such as file systems and logical volumes; thus, a write-back cache may also be associated with one or more logical storage devices. In an environment employing a write-back cache, the previous version of the data block may be available at the back-end storage device while the updated version is available in the cache. A write-back cache differs from a write-through cache in that in the case of a write-through cache, an updated data block may be written in parallel to both the back-end storage device and the write-through cache, and the update for a write-through cache is not usually considered complete until it completes on the back-end storage device. In some embodiments, a write-back cache may be configured as a non-volatile cache, i.e., a mechanism such as a battery back-up may be used to ensure that data stored within the cache is not lost in the event of a failure such as a power loss.

A storage consumer, such as 120, may send a request to update data within storage device 110 to device management software 130. As described below in further detail, the characteristics of storage device 110, and the storage functionality provided by storage device 110, may differ in different embodiments. For example, in some embodiments, storage device 110 may be a block storage device, while in others it may be an object storage device. Further, storage device 110 may be a physical storage device, e.g., a disk array device, or a virtual storage device, such as a file system, a mirrored logical volume, or a distributed virtual RAID device. A physical storage device may comprise backing storage (i.e., long-term persistent storage such as disk storage), while a logical storage device 110 may have associated backing storage (i.e. physical storage where the data of the logical storage device may be persistently stored). Both physical and logical storage devices may have an associated front-end write-back cache, which may be a non-volatile cache memory to which writes are staged prior to eventually being written to the backing storage. Multiple backing storage devices may be associated with a single storage device in some embodiments. Depending upon the storage functionality being provided by storage device 110, some or all of the update requests from storage consumer 120 may require special handling, in that the previous version of the data being updated may be required at a storage processing node 125, before it is overwritten within storage device 110.

As used herein, a "storage processing node" may be any software or hardware entity, such as a physical or logical device, a thread or process, a module, a host or a server, where the previous version of the data block may be needed to perform a particular storage-related function. Storage processing node 125 may be linked to the storage device, e.g., over a network, and may include, for example, storage consumers other than storage consumer 120, storage devices other than storage device 110, or metadata servers such as a volume server in a distributed virtualization environment, as described below in further detail. In some embodiments, storage processing node 125 may be a software module executing at the same host as the storage consumer 120, or even a different thread of the same executable program as the storage consumer 120. Storage processing node 125 may require the previous version of the data to perform or complete one or more operations, such as snapshot creation or update, a redundancy computation, etc. Further examples of the conditions under which the previous version of the updated data may be required at a storage processing node are provided below.

Figure 2:
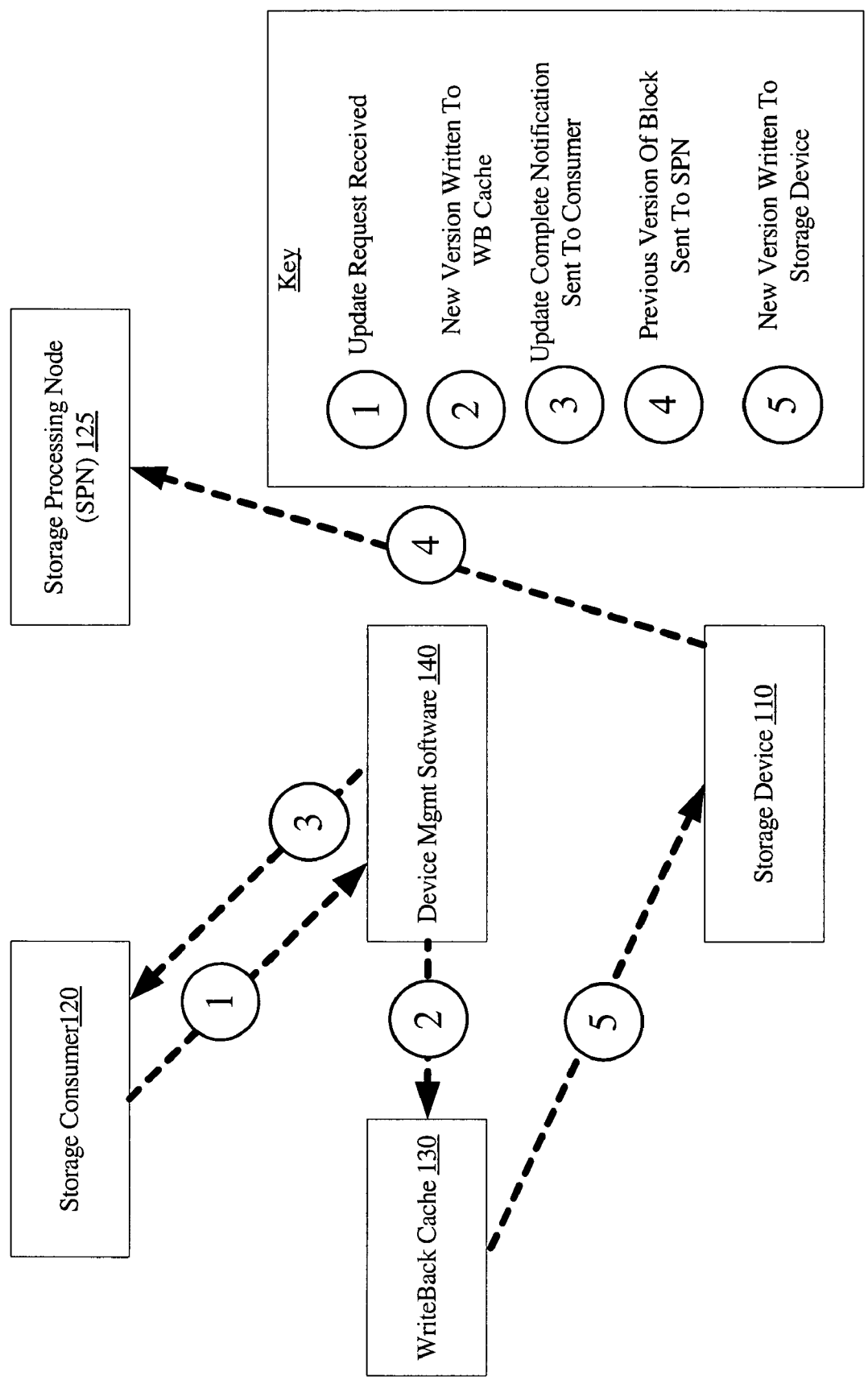
FIG. 2 is a block diagram illustrating a sequence of operations that may be performed to update a unit of data of a storage device according to one embodiment.

Device management software 130 may be configured to utilize write-back cache 140 to provide the special handling required for update requests in an efficient manner. FIG. 2 (a block diagram) and FIG. 3 (a flow diagram) collectively illustrate a sequence of operations performed in one embodiment of system 100 to update a unit of data (e.g., a block or an object such as a file) of storage device 110. A request to update the data, containing a new version of the data to be stored, may be sent by storage consumer 120 (block 310 of FIG. 3) and received at device management software 130 (operation 1 of FIG. 2). Device management software 130 may be configured to store the new version of the data within write-back cache 140 in response to the update request (operation 2 of FIG. 2, block 320 of FIG. 3). When the new version has been stored in write-back cache 140, device management software may send a notification indicating that the update request has been completed back to storage consumer 120 (operation 3 of FIG. 2, block 330 of FIG. 3), thereby allowing storage consumer 120 to proceed to the next operation after receiving the notification (blocks 340-350 of FIG. 3).

Figure 3:
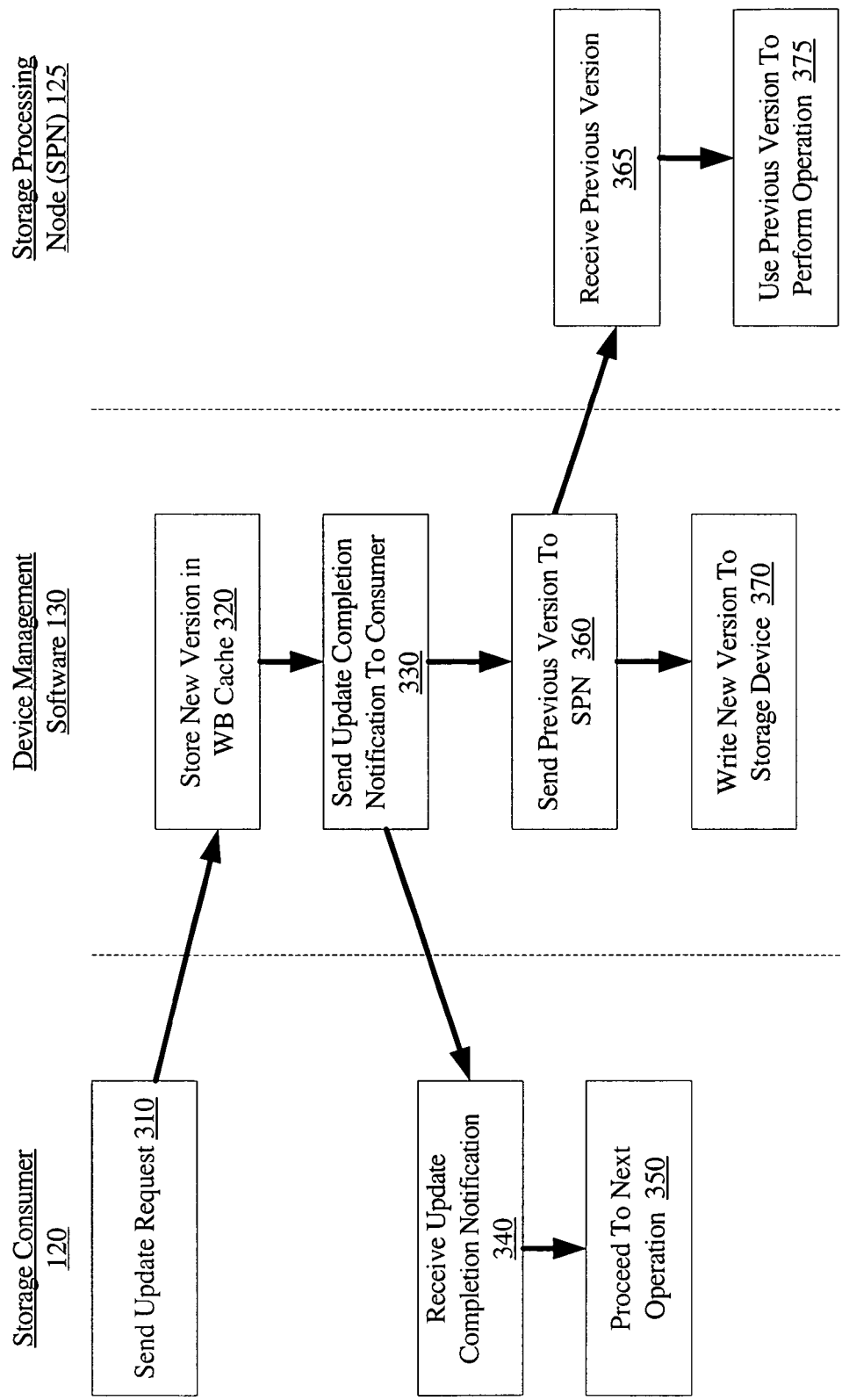
FIG. 3 is a flow diagram illustrating a sequence of operations that may be performed to update a unit of data of a storage device according to one embodiment.

After the notification has been sent, device management software 130 may provide a previous version of the data block to storage processing node 125 (operation 4 of FIG. 2, block 360 of FIG. 3). The previous version of the data block may have to be read from storage device 110 by device management software 130. The previous version may be provided to storage processing node 125 some time after the notification has been sent, i.e., it may be provided asynchronously with respect to the update request. This asynchronous operation may ensure that latency associated with obtaining the previous version and providing it to storage processing node 125B (which may require one or more messages to be sent over a network in some embodiments) does not affect the responsiveness of the system to the update request as seen at storage consumer 120. As described below in further detail, one or more stimuli, such as an explicit request for the previous version from storage processing node 125, may trigger the scheduling of the provision of the previous version to storage processing node 125.

Once the previous version of the data has been supplied to storage processing node 125, device management software 130 may overwrite the previous version with the new version (operation 5 of FIG. 2, block 370 of FIG. 3). Having received the previous version of the data (block 365 of FIG. 3), storage processing node 125 may proceed to perform the desired operation upon the previous version of the data (block 375 of FIG. 3). These two operations—the overwriting of the previous version of the data by device management software 130, and the operation upon the previous version of the data by storage processing node 125—may be scheduled independently of each other based upon various factors. For example, the previous version of the data may be overwritten in order to free up space within write-back cache 140, while the operation upon the previous version of the data may be scheduled by an operating system scheduler at a server hosting storage processing node 125.

Figure 4:
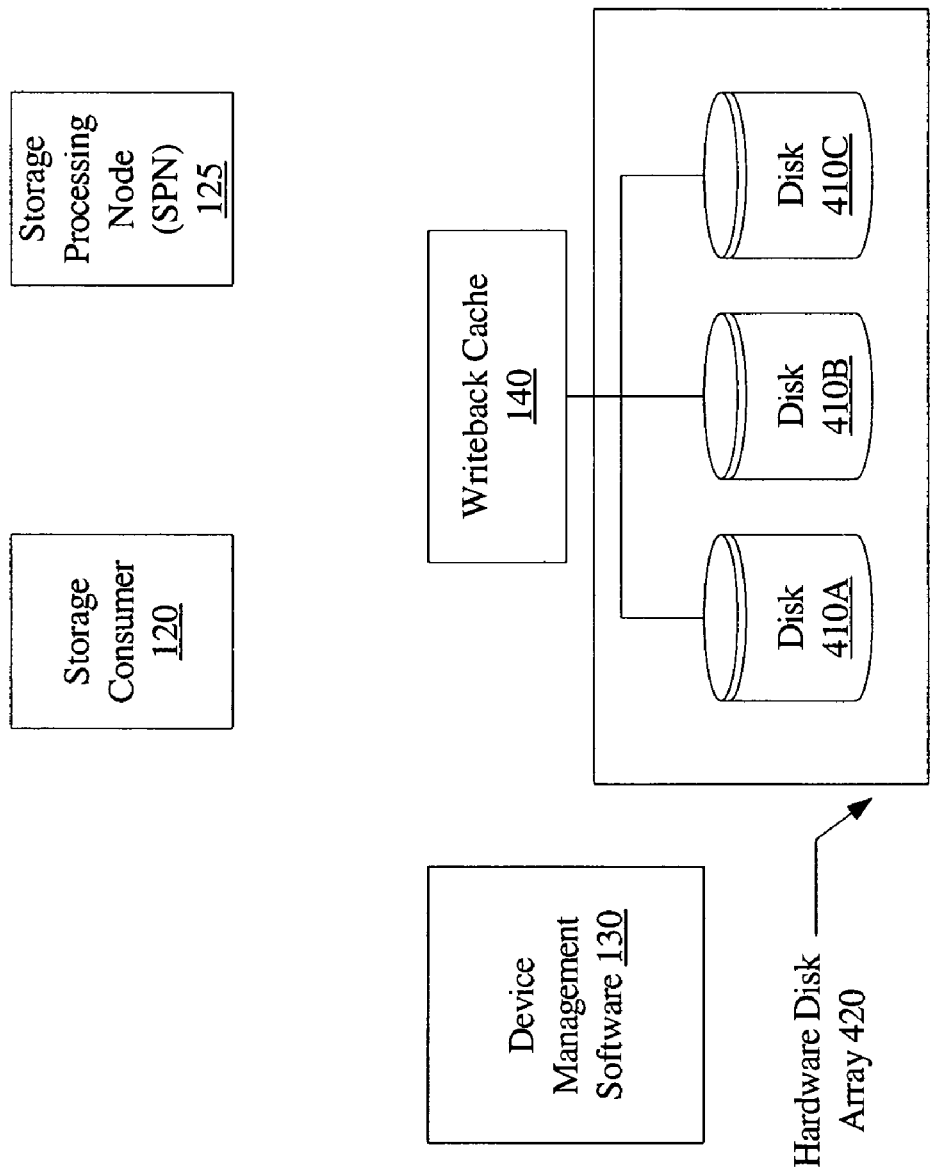
FIG. 4 is a block diagram illustrating one embodiment of a storage system where a set of individual disk drives may be organized as a hardware disk array.

As noted earlier, in some embodiments storage device 110 may be a physical storage device such as a physical block device. Generally speaking, a physical block device may comprise any hardware entity that provides a collection of linearly addressed data blocks that can be read or written. For example, in one embodiment a physical block device 110 may be a single disk drive configured to present all of its sectors as an indexed array of blocks. In another embodiment, as illustrated in FIG. 4, a set of individual disk drives 410A-410C may be organized as a single storage device 110 in the form of a hardware disk array 420. Hardware disk array 420 may present data from its constituent disk drives 410A-C as a single contiguous storage address range to a storage consumer 120. It is contemplated that any suitable type of storage device may be configured (singly or as part of a collection or an array) as a physical block device, such as fixed or removable magnetic media drives (e.g., hard drives, floppy or Zip-based drives), writable or read-only optical media drives (e.g., CD or DVD), tape drives, solid-state mass storage devices, or any other type of storage device. Physical storage devices 110, such as disks or tape drives, may be configured to present some form of SCSI interface, though other interfaces are possible and contemplated.

Figure 5:
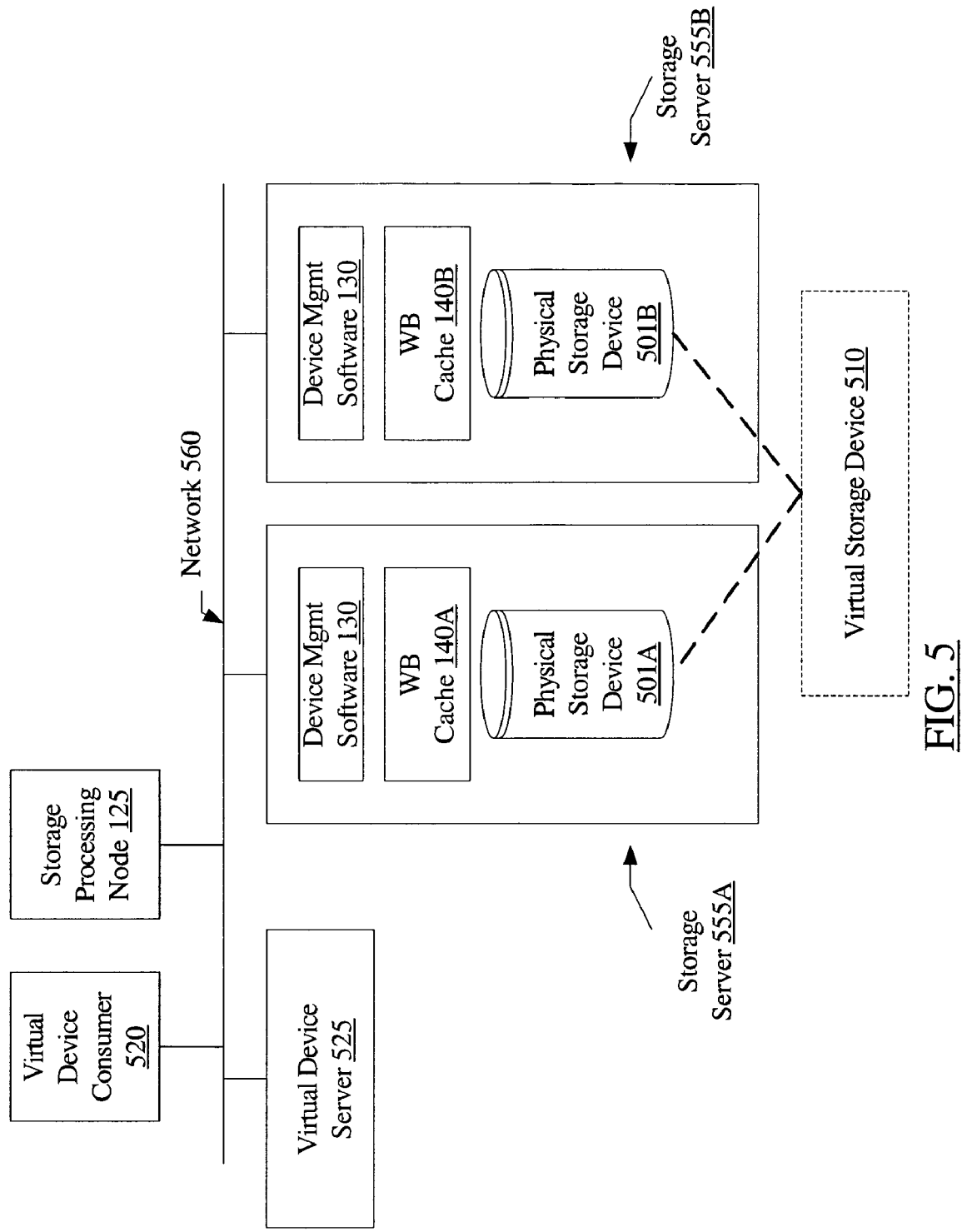
FIG. 5 is a block diagram illustrating one embodiment where a virtual device server is configured to aggregate storage within physical storage devices into a virtual storage device.

In some embodiments, storage device 110 may be a virtual device, such as a file system or a virtual block device (e.g., a logical volume), rather than a physical device. FIG. 5 is a block diagram illustrating one embodiment where a virtual device server 525 is configured to aggregate storage within physical storage devices 501A and 501B into a virtual storage device 510, and to make virtual storage device 510 accessible to storage consumers such as virtual device consumers 520. As stated above, a storage processing node 125 may be a storage consumer in some embodiments. Therefore, in the subsequent discussion on virtualization, the term "virtual device consumer" will generally include those storage processing nodes 125 that are also storage consumers; that is, the general description of virtual device consumers may be assumed to apply to the subset of storage processing nodes 125 that are also storage consumers. In the illustrated embodiment, access to a given physical storage device 501 (i.e., 501A or 501B) may be provided by a corresponding storage server 555 (555A or 555B). Each storage server 555 may incorporate a corresponding write-back cache 140 and may be configured to execute device management software 130. (In some embodiments, a single write-back cache 140 may be employed for a virtual device whose data may be spread over multiple physical storage devices). Virtual device server 130, virtual device consumers 520, and storage servers 555 may communicate with each other over a network 560. If virtual storage device 510 is a logical volume (i.e., if it provides a block-level interface to storage consumers), virtual device server 525 may be termed a volume server, and virtual device consumers 520 may be termed volume consumers.

It is noted that in the storage virtualization environment depicted in FIG. 5, virtual device server 525 may require access to storage within virtual storage device 510 (for example, to perform configuration or recovery operations on device 510), and may thus be considered an additional storage processing node for device 510. Similarly, for some storage operations, such as the parity computations described below, device management software 130 from another storage server (e.g., from storage server 555B) may also be a storage processing node for the part of virtual storage device 510 mapped to physical storage device 501A at a give storage server 555A.

Storage within physical devices 501 may be mapped into a hierarchy of different kinds of virtual storage devices in some embodiments: for example, a file system may use one or more logical volumes, while a given logical volume may map storage from one or more physical storage devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device may read or write blocks directly to the device, bypassing any file system that may be in use. In some embodiments, a block storage device 510 presented by an operating system for use by a consumer may present relatively few primitives through which the device may be manipulated. For example, in one embodiment a block storage device 510 may support open, close, read and write primitives, plus a few miscellaneous control and query primitives. In contrast, a file system may provide a richer set of primitives, such as support for creating and removing files, appending to files, creating and removing directories, etc.

In one embodiment where block virtualization is employed, a storage server 555 may be configured to implement an advanced block I/O interface optimized to service requests from virtual device servers 525, and virtual device consumers 520. That is, virtual device servers 525 and virtual device consumers 520 may communicate with storage server 555 over network 160 using an advanced storage access protocol that may differ from more traditional interfaces (such as variants of SCSI or iSCSI). The advanced storage access protocol may support features, such as access security and tagged directives for distributed I/O operations, that may not be adequately supported by the traditional interfaces alone. In such an embodiment, storage server 555 may use device management software 130 to translate data access requests from the advanced storage protocol to a lower level protocol or interface (such as SCSI) that may be presented by the physical storage devices 501 managed at storage server 555. While the advanced storage access protocol may provide enhanced functionality, it may still allow block-level access to physical storage devices 501. E.g., virtual device consumers 520 and virtual device servers 130 may still access a block of physical block device 501 without requiring the use of a file system.

Generally speaking, a logical volume such as virtual device 510 may comprise a block device that may be presented directly for use by a block device consumer, e.g., a virtual device consumer 520. In one embodiment, a virtual device consumer 520 may be a file system or an application (such as a database application, for example) that can directly use block devices. As described in greater detail below, in some embodiments employing block device virtualization, a given volume such as virtual device 510 may be associated with several logical or physical block devices. In such embodiments, each block device included in the logical organization of a given volume or virtualized block device may be referred to as a storage object or logical storage object.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. In embodiments employing block virtualization, such a disk driver may be generally unaware of block virtualization and may in some instances present a barrier to using some virtualization techniques, whereas a volume implementing various block virtualization features may be directly accessible by a consumer without the issues presented by such disk drivers.

A volume manager, such as virtual device server 525, may introduce virtualization of blocks, creating some number of virtualized block devices out of one or more physical or logical block devices. (In some embodiments, devices such as intelligent disk arrays and virtualization switches may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented within a given logical volume. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

A volume server (e.g., virtual device server 525) may provide functions such as configuration management of virtualized block devices and distributed coordination of block device virtualization. For example, in one embodiment virtual device server 525 may be aware of the type and quantity of physical storage devices, such as physical block devices 501, that are available within a storage system. In various embodiments, the virtualization functions provided by a virtual device server 525 may be provided at different levels in the storage hierarchy between a virtual device consumer 520 and physical storage devices 501.

For example, in one embodiment, virtual device consumers 520 may be provided with a description of a virtualized block device and may be configured to directly access constituent block devices comprising the virtualized device. Such virtualization may also be referred to as host-based or client-based virtualization. In response to a request to configure a virtual block device, for example according to a desired set of virtualization features, virtual device server 525 may be configured to build a volume description that describes how a collection of storage objects compliant with the desired features maps to underlying physical block devices. The volume description identifying a particular volume (e.g., virtual storage device 510) may be distributed to one or more virtual device consumers 520. Each virtual device consumer 520 may be configured to interact with virtual device server 525 for certain functions, for example management or administrative functions. For typical block read and write activity, each virtual device consumer 520 may be configured to interact directly with various storage servers 555 (e.g., via device management software 130) according to the volume description distributed by virtual device server 525.

Distribution of a virtualized block device as a volume to one or more virtual device consumers 520 may also be referred to as distributed block virtualization. In some embodiments, after virtual device server 525 has distributed a volume description of a given virtual block device to a given virtual device consumer 520 as a particular volume 510, the given virtual device consumer 520 may interact with that particular volume 510 to read and write blocks without further involvement on the part of virtual device server 525, as described above. That is, the given virtual device consumer 520 may use the structure of the particular volume 510 to transform logical I/O requests into physical I/O requests directed to specific physical storage devices, such as devices 501.

In some embodiments, details of block virtualization may not be directly available to individual virtual device 520. In some such embodiments, the virtualization function of virtual device server 525 may be implemented in a device or layer of abstraction in between virtual device clients 520 and physical storage devices 501, such as a switch or virtualization appliance. Such virtualization may also be referred to as switch-based or appliance-based virtualization.

Additionally, in some embodiments, multiple layers of virtualization may be employed, for example at the host level as well as at the switch or appliance level. In such embodiments, some aspects of virtualization may be visible to virtual device consumers 520, as in the host-based model, while some aspects may be implemented transparently by an intermediate device, as in the switch-based model. Further, in some multilayer embodiments, the virtualization details of one block device (e.g., one volume 510) may be fully defined to a virtual device consumer 520 (i.e., without further virtualization at the switch layer), while the virtualization details of another block device (e.g., another volume) may be partially or entirely transparent to virtual device consumer 120.

In some embodiments, a virtual device server 525 may be configured to distribute all defined volumes 510 to each virtual device consumer 520 present within a system. Such embodiments may be referred to as symmetric distributed block virtualization systems. In other embodiments, specific volumes may be distributed only to respective virtual device consumers 520, such that at least one volume 510 is not common to two virtual device consumers 520. Such embodiments may be referred to as asymmetric distributed block virtualization systems.

As described above, various virtualization features such as striping, mirroring, replication, and snapshot capabilities may be available for a given storage device or volume 510. In some embodiments, a technique known as "copy-on-write" (COW) may be employed to provide various virtualization functions, for example to create a snapshot or point-in-time copy of a volume. The use of a COW technique may result in the requirement for special handling of updates described previously (i.e., where a previous version of a data block targeted for an update may be required at a second storage consumer), as described below in further detail.

Generally speaking, a snapshot of a data object contains an image of the data as of a particular point in time. Snapshots may be used for a variety of reasons, including backups (such as off-host backups) and offline analysis of data, e.g., by decision support systems or data mining applications. One method of creating a snapshot of a logical volume 510 utilizes mirroring functionality provided by a volume server such as virtual device server 525. Using this method, multiple mirrors of the logical volume may first be created, for example by attaching and synchronizing one or more mirrors at an existing volume, so that the entire data set of the logical volume is replicated at each mirror. A snapshot may then be created by breaking off one mirror in a controlled manner. That is, applications accessing the volume may be quiesced (i.e., prevented from issuing new I/O requests); in-flight I/O operations may be completed; one mirror may be detached from the parent logical volume and placed in a separate volume unaffected by future I/Os to the parent volume; and finally, applications may be allowed to resume I/O on the parent volume. However, a mirror attach and synchronization for a large volume (e.g., a volume containing a terabyte of data) may take many hours or even days.

Instead of copying the entire data set of a logical volume 510, a COW technique may be used to more efficiently create (or update) a lightweight snapshot of logical volume 510. If a data block on the parent or source volume is to be updated after the COW snapshot is taken, the previous version of the data block is copied over to the snapshot prior to being overwritten, and the block number or identifier is stored as part of snapshot metadata. This operation may be termed a "COW push" operation. Subsequent updates on the COW-pushed data block by storage consumers are handled normally. If a snapshot data block is to be read, for example by a data mining application, the old version must be provided. If the block number of the requested block has been stored in the snapshot metadata, it is identified as a COW-pushed block, and the block may be read from the snapshot itself. If the block number is not stored in the snapshot metadata, the read request is satisfied by using the block from the parent volume rather than the snapshot.

In addition to their use in creating snapshots, COW techniques may also be used during snapshot updates. If a snapshot S is created from a parent volume 510 at time T0, a snapshot update may be performed at a later time T1 to re-synchronize S with volume 510, such that changes made to the data of volume 510 between time T0 and a later time T1 are included within updated snapshot S. COW techniques similar to those described above for volume snapshot creations and updates may also be used to create and update snapshots of file systems or other storage objects such as disk arrays.

Any suitable storage device 110 with a front-end write-back cache 140 where such a COW technique is used may employ the special handling of updates described in conjunction with the descriptions of FIG. 2 and FIG. 3 above. Thus, instead of performing a COW push synchronously with an update requested at a parent storage device 110, the old data block may be read and/or pushed to the snapshot device (which may be considered the storage processing node 125) asynchronously, allowing the an updating storage consumer 120 to proceed quickly to its next operation without waiting for the COW push to complete. Such asynchronous COW pushes may help reduce update latency substantially, especially in storage environments where the snapshot device may be remote with respect to the parent storage device 110 (e.g., where one or more messages over a relatively slow network such as a WAN may be required to transfer the old data block to the snapshot device).

Figure 6:
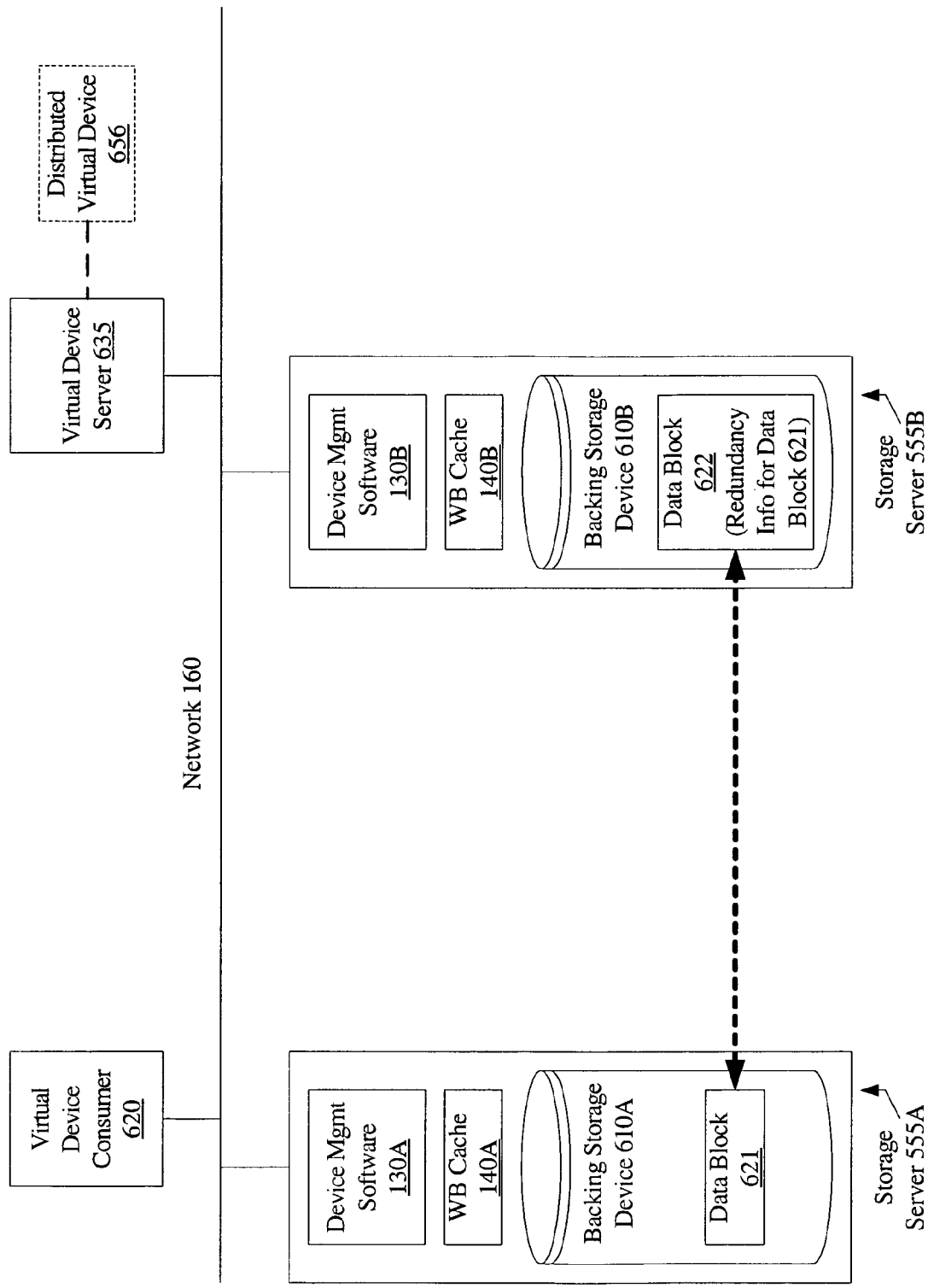
FIG. 6 is a block diagram illustrating one embodiment of a storage system employing redundancy in a distributed virtual storage device.

In addition to storage devices employing COW techniques, other classes of storage devices 110 may also benefit from asynchronous reads of old data blocks in the manner described above. For example, storage devices configured to support high availability using redundancy (e.g., using parity or any other suitable redundancy computations) may utilize such asynchronous reads. FIG. 6 is a block diagram illustrating one embodiment of a storage system employing redundancy in a distributed virtual storage device. The storage system may include a first storage server 555A and a second storage server 555B, where each storage server may include a corresponding write-back cache 140 (e.g., write-back cache 140A for storage server 555A, and write-back cache 140B for storage server 555B) and a corresponding backing storage device 610. In addition, each storage server may incorporate corresponding device management software 130: e.g., device management software 130A at storage server 555A, and device management software 130B at storage server 555B. As described below, the device management software 130B may represent a storage processing node 125 for blocks of distributed virtual device 656 stored at storage server 555A.

A virtual device server 635 may be configured to aggregate storage from the first and second storage servers into a virtual storage device 656, such that an update to a first data block 621 of the virtual storage device 656 requires a redundancy computation using a previous version of data block 621, stored at the first storage server 555A, and a previous version of a second block 622, stored at the second storage server 555B. In the illustrated embodiment, the second block 622 may include the redundancy information (i.e., the results of the redundancy computation may be stored within the second block). The redundancy computation may also require other inputs as well as the previous versions of the first and second data blocks, such as a new version of the first data block—for example, as described below in conjunction with the descriptions of FIG. 8 and FIG. 9, in one specific embodiment the redundancy computation may include a series of XOR (logical exclusive-OR) operations on the previous version of data block 621, the new (i.e., updated) version of data block 621, and the old version of a parity block 622.

Figure 7:
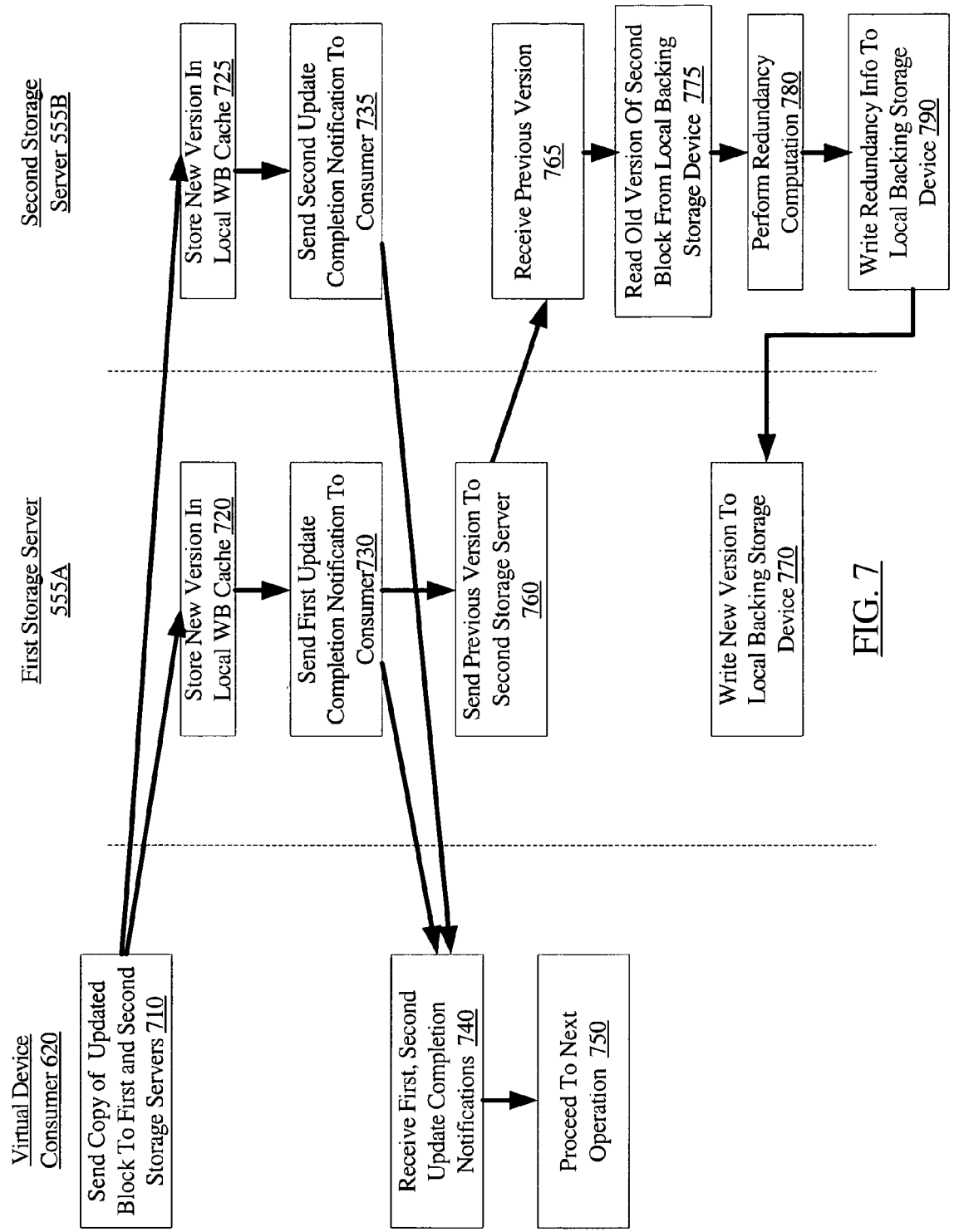
FIG. 7 is a flow diagram illustrating aspects of the operation of a virtual storage consumer and two storage servers during an update of a data block according to one embodiment.

Virtual device server 635 may be configured to make virtual storage device 656 accessible to virtual device consumer 620, e.g., to allow virtual device consumer 620 to perform I/O operations on virtual storage device 656. FIG. 7 is a flow diagram illustrating aspects of the operation of virtual storage consumer 620 and storage servers 555A and 555B during an update of a data block 621 according to one embodiment. As shown in block 710 of FIG. 7, virtual device consumer 620 may be configured to send a first copy of the updated data block to device management software 130A at first storage server 555A and a second copy of the updated data block to device management software 130B at second storage server 555B. In order to compute the new redundancy information corresponding to block 621, a previous version of the data block 621, the new version of the data block 621, and the previous version of the data block 622 may be required at second storage server 555B. It is noted that in one embodiment, the contents of the updated data block may be forwarded from storage server 555A to storage server 555B (e.g., instead of being sent to both storage servers by the virtual device consumer 620). In another embodiment, storage server 555B may send a request for the contents of the updated data block to storage server 555A, and storage server 555A may send the contents to storage server 555B in response to the request.

Device management software 130A at storage server 555A may store the new version of data block 621 in local write-back cache 140A (block 720) and may send a first update completion notification to virtual storage consumer 620 (block 730). Similarly, device management software 130B at storage server 555B may store the new version of data block 621 in write-back cache 140B (block 725) and send a second update completion notification to volume consumer 620. Volume consumer 620 may receive the first and second update completion notifications (block 740), indicating that copies of the new version of data block 621 have been stored at two different storage servers. If a failure occurs at either storage server after the two copies of new data block 621 have both been stored at a respective storage server cache, a recovery process may be able to obtain the new data block 621 from the other storage server (e.g., if a failure occurs at storage server 555A, the new version of data block 621 may be obtained from storage server 555B). Thus, having received the two update completion notifications, collectively indicating that the new version of data block 621 has been redundantly stored, volume consumer 620 may proceed to its next operation (block 750).

Some time after sending the first update completion notification, device management software 130A may send the previous version of data block 621 to device management software 130B at storage server 555B (block 760). After receiving the previous version of data block 621 (block 765), device management software 130B at storage server 555B may have all the data needed to compute the new redundancy information. Thus, device management software 130B may read the previous version of data block 622 (block 775), perform the desired redundancy computation (block 780) and write the new version of the parity block to local backing storage device 610B. Such a separation of redundancy computation steps into asynchronous operations may result in a substantial reduction in update latency as viewed by virtual device consumer 620. In some embodiments, storage server 555A may wait to receive an acknowledgement from storage server 555B that the desired redundancy computation has completed and has been safely persisted (i.e., either to a non-volatile cache, e.g., in embodiments where write back cache 140B is a non-volatile cache, or to backing storage) prior to replacing the previous version of data block 621 (block 770). By waiting for the acknowledgement, storage server 555A may ensure that the previous version remains accessible in case it is needed for recovery, e.g., if a recomputation of the redundancy value is needed as a result of a system crash at the second storage server before the redundancy computation results are made persistent.

Figure 8:
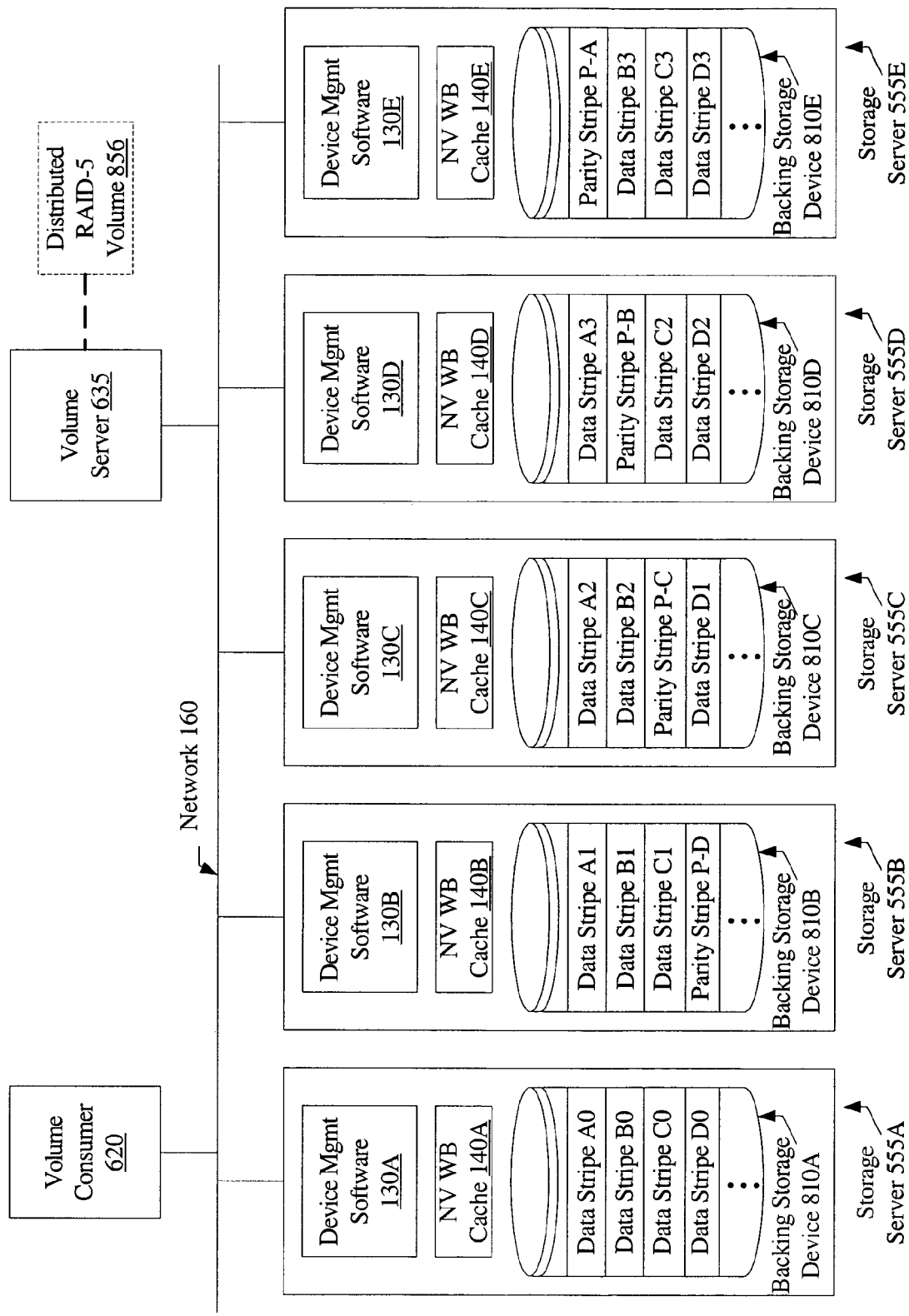
FIG. 8 is a block diagram illustrating a block device configured as a distributed virtual RAID-5 volume according to one embodiment.

In one specific embodiment, illustrated in FIG. 8, a block device may be configured as a distributed virtual RAID-5 (Redundant Array of Inexpensive Disks-Level 5) volume 856; that is, the redundancy computation described above may be a RAID parity computation. A virtual device server such as volume server 635 may aggregate storage within backing storage devices 810A-E spread across multiple storage servers 555A-E, and present the aggregated storage to a volume consumer 620 as a single virtual RAID-5 device (i.e., a device implementing the RID-5 architecture, where logically consecutive data units are interleaved across multiple physical storage devices, and parity data units are distributed among all the physical storage devices). For example, as shown, the data of device 856 may consist of equally-sized data stripe units A0, A1, A2, and A3 forming a data stripe A, logically followed by a data stripe B containing data stripe units B0, B1, B2, B3, followed by a data stripe C, and so on. For each data stripe consisting of four data stripe units, a parity stripe unit of the same size as one data stripe unit may be derived and stored; for example, parity stripe unit P-A may be obtained by performing logical exclusive-OR (XOR) operations on corresponding bits of data stripe units A0, A1, A2, and A3. Thus, bit 0 of the parity stripe unit P-A may be obtained by performing an XOR operation between bit 0 of A0 and bit 0 of A1 to yield a result bit R1, followed by an XOR of R1 with bit 0 of A2 to yield a second result bit R2, followed by an XOR of R2 with bit 0 of A3.

As shown in FIG. 8, each set of five stripe units (four data stripe units and a corresponding parity stripe unit) may be distributed across the five backing storage devices according to the RAID-5 architecture. Thus, for data stripe A, data stripe units A0-A4 may be placed at backing storage device 810A-D, and parity stripe unit P-A at backing storage device 810E; while for data stripe B, data stripe units B0-B3 may be placed at backing storage device 810A-C, parity stripe unit P-B at backing storage device 810D, and data stripe unit B4 at backing storage device 810E. Similarly, the data stripe units and parity stripe units for each successive data stripe may be spread over each of the five backing storage devices shown. Each storage server 555 may incorporate a corresponding non-volatile write-back cache 140 (i.e., cache 140A at storage server 555A, cache 140B at storage server 555B, etc.) and device management software 130 to handle updates as described below. The configuration of a virtual distributed RAID-5 device in the manner described above may provide data availability in the event of a failure of a storage server (in contrast, a hardware RAID-5 device may become unavailable if its hosting storage server fails).

An update to a data stripe unit such as A0 requested by an application at volume consumer 620 may require that a new parity value for data stripe A be calculated and stored at the appropriate physical block device (e.g., 810E in the case of A0). An XOR of the old and new versions of data stripe unit A0, followed by an XOR of the result of that operation with the old parity stripe unit P-A, may yield the desired new parity stripe unit. Using this technique, two stripe unit reads (old data, old parity) and two stripe unit writes (new data, new parity) may be required to update a data stripe unit and its associated parity. (This may be more efficient than reading all old data stripe units A1-A3, performing the required XORs on the new data stripe unit A0 and the old data stripe units, and writing the new data stripe unit and the new parity stripe unit—a total of five stripe units read or written, and three stripe unit XOR operations, for one data stripe update in the depicted configuration).

Figure 9:
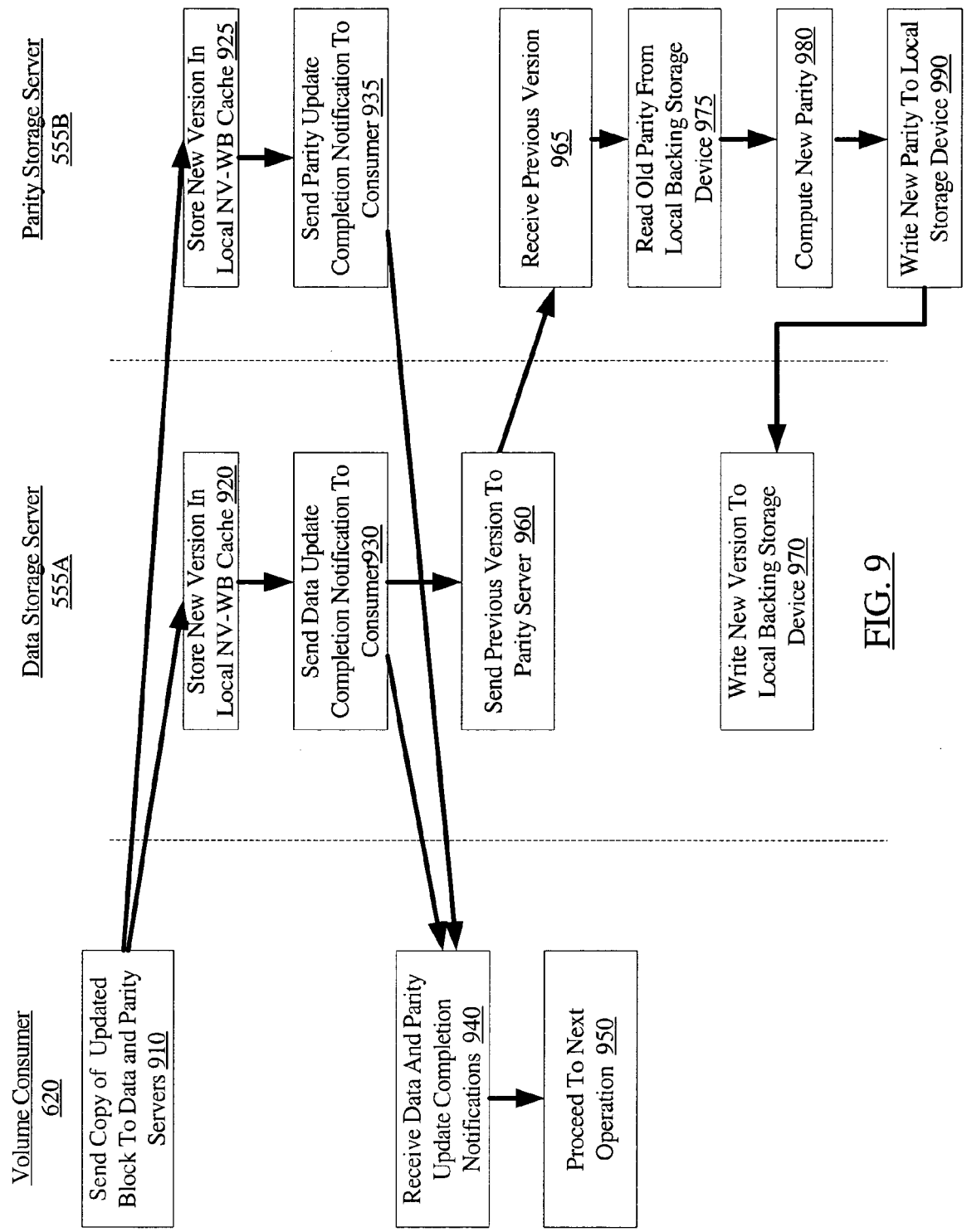
FIG. 9 is a flow diagram depicting aspects of the operation of storage servers and a volume consumer of a distributed virtual RAID device during an update of a data block and its associated parity block.

FIG. 9 is a flow diagram depicting aspects of the operation of two storage servers (555A and 555B) and a volume consumer 620 of a distributed virtual RAID device 856 during an update of a data block D0 and its associated parity block P-D. Volume server 635 may have provided the layout of distributed virtual RAID-5 device 856 to volume consumer 620, enabling volume consumer 620 to identify the data storage server (i.e., 555A) providing access to the data block D0 being updated, and the parity storage server (i.e., 555B) for a particular data block D0. As shown in block 910 of FIG. 9, volume consumer 620 may send a first copy of the updated data block to device management software 130A at data storage server 555A and a second copy of the updated data block to device management software 130B at parity storage server 555B. As described above, in order to compute the new version of parity block P-D, a sequence of XOR computations may be required on the previous version of the data block D0, the new version of the data block D0, and the previous version of the parity block P-D. Along with the copy of the updated data block, in one embodiment volume consumer 620 may also provide an identification of the parity storage server 555B to device management software 130A, and an identification of the data storage server 555A to device management software 130B. In another embodiment, the layout of the distributed virtual RAID-5 device may be provided to each storage server 555 by volume server 635, allowing device management software 130A to identify the specific parity storage server for any data block of device 810A, and a list of data storage servers 555 and their data blocks that correspond to a given parity data block stored at device 810A.

Device management software 130A at storage server 555A may store the new version in local non-volatile write-back cache 140A (block 920) and may send a data update completion notification to volume consumer 620 (block 930). Similarly, device management software 130B at parity storage server 555B may store the new version of D0 in non-volatile write-back cache 140B (block 925) and send a parity update completion notification to volume consumer 620. Volume consumer 620 may receive completion notifications for both the data update and the parity update (block 940) and may then proceed to its next operation (block 950). Some time after sending the update completion notification, device management software 130A may send the previous version of data block D0 to device management software 130B at parity storage server 555B (block 960). After receiving the previous version of D0 (block 965), device management software 130B at parity storage server 555B may have all the data needed to compute the new parity. Thus, device management software 130B may read the previous version of the parity block P-D (block 975), compute the new version of the parity block (block 980) and write the new version of the parity block to local backing storage device 810B. After an acknowledgment indicating that the new version of the parity block has been made persistent is received at storage server 555A, the new version of D0 may be written to local backing storage device 810A (block 970). In some embodiments, the acknowledgment may be sent as soon as the new version of the parity block has been written to a non-volatile cache, instead of being sent after the new version has been written to backing storage.

It is noted that various extensions of the above technique may be utilized in different embodiments to handle cases such as update requests that span multiple consecutive data blocks, overwrites (e.g., multiple updates of different parts of the same data block in close time proximity), and the like. In one embodiment, for example, in response to an update request that spans multiple data blocks of the same data stripe (e.g., data blocks A0, A1, and A2 of stripe A), device management software 130 at a parity storage server (e.g., 555B) may be configured to read the previous version of the parity block just once, perform the XOR operations on all the updated blocks and write the updated parity just once. In another embodiment, instead of sending the previous version of a data block to a parity storage server 555B, device management software 130 at the data storage server 555A may be configured to perform XOR operations on the previous version and the new version or versions (in the case of overwrites) and send the result of the XOR operations to the parity storage server 555B. In one specific embodiment, in order to ensure that a volume consumer 620 does not inadvertently corrupt a parity block by sending inconsistent versions of the data block to the data storage server 555A and the parity storage server 555B, volume consumer 620 may be configured to send the data block only to the data storage server 555A. Device management software 130 at data storage server 555A may be configured to forward a copy of the updated data block to the parity storage server 555B in such an embodiment.

Various other distributed virtual RAID devices may also be provided in a block virtualization environment in accordance with different RAID architectures in different embodiments, e.g., RAID-4. It is also noted that the data and parity of a distributed virtual RAID device may be distributed across more or fewer physical storage devices such as backing storage devices 810 than depicted in FIG. 8 (as long as more than two backing storage devices are used for a RAID-4 or RAID-5 device), and that multiple backing storage devices 810 may be managed within a single storage server 555 in some embodiments. In one embodiment, for example, multiple logical columns of a RAID device (such as a first column including data stripes A0, B0, C0 and D0 from FIG. 8, and a second column including stripes A1, B1, C1 and P-D) may be stored at a single storage server 555, e.g., using two different backing storage devices 810. In other embodiments, a virtual distributed RAID device may employ multiple layers of virtualization, i.e., instead of utilizing physical block devices, virtual block devices may be employed to store data and parity stripe units, and the virtual block devices may each be aggregated from storage within other virtual or physical block devices. The technique of asynchronous provision of a previous version of a data block for parity computation may be employed in various embodiments of parity-based or calculated-redundancy storage architectures.

Figure 10:
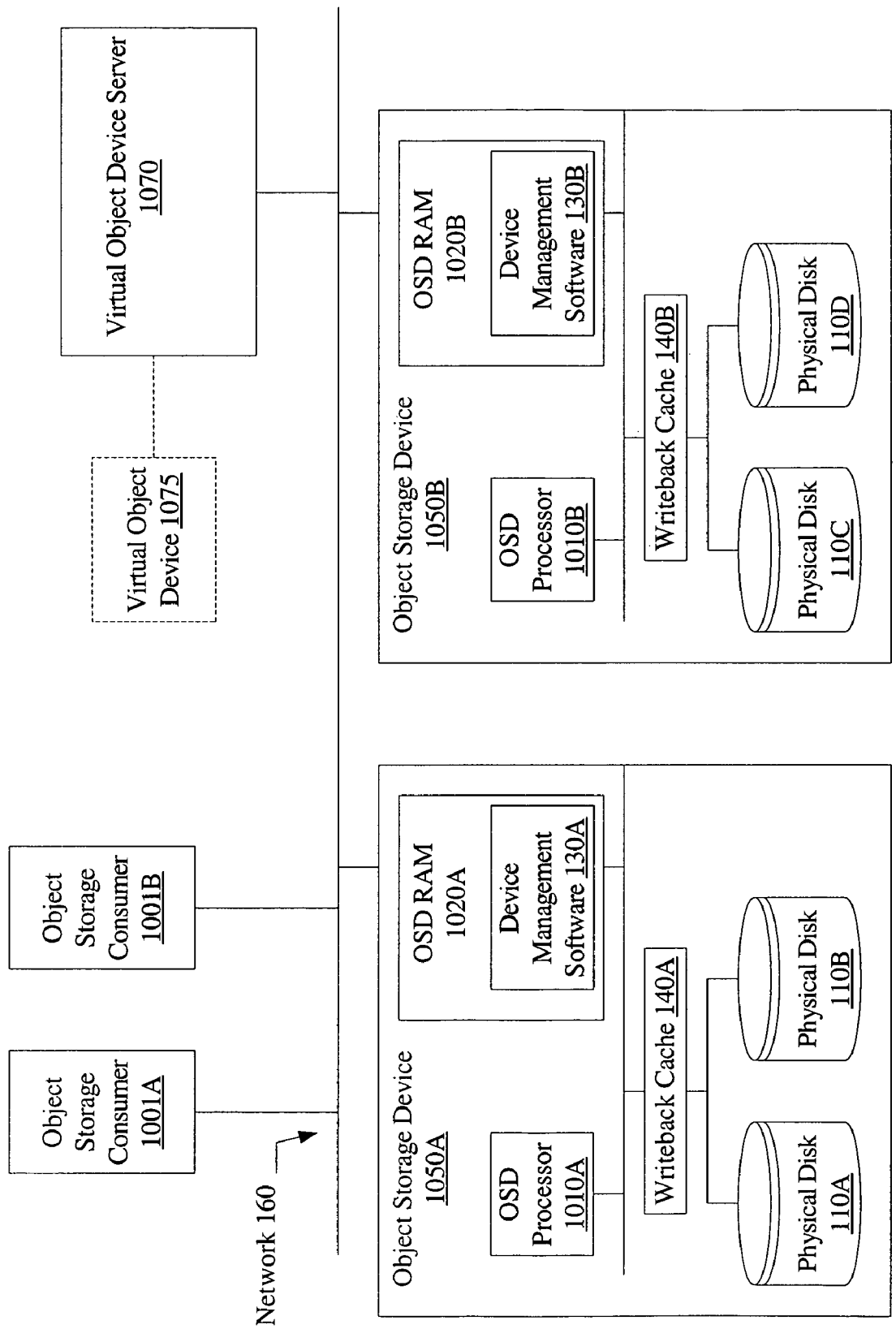
FIG. 10 is a block diagram illustrating an embodiment of a storage system employing object-based virtualization.

As noted earlier, in contrast to block virtualization environments, in some embodiments, object-based virtualization may be employed: that is, a virtual object device server may be configured to organize storage within storage devices 110 as higher-level logical objects (such as files) instead of using the block-based interface described above. FIG. 10 is a block diagram illustrating an embodiment of an object-based storage virtualization system that conforms generally to the system illustrated in FIG. 1. In an object virtualization environment, virtual storage may be named, managed, and made accessible using any desired base object as implemented by virtual object device server 1070, such as a file object or a database table object. Thus, in one embodiment, an object storage consumer 1001A may be presented with a virtual storage device 1075 consisting of a collection of named files, and may perform file-based operations (such as reads from a file, writes to a file, increasing the size of a file, truncating a file, etc.) directly on the virtual storage device. Object-based virtualization may thus allow the offloading of functionality traditionally performed at a host computer system (such as the translation of a file name and offset within a file to a block device address) to a storage device such as an object storage device or OSD (e.g., devices 1050A and 1050B in FIG. 10) that may be optimized to perform the needed storage operations, freeing up resources at the host computers. In addition, once virtual objects have been created and configured, virtual object device server 1070 may distribute metadata on the virtual objects to object storage consumers 1001, allowing the object storage consumers to perform input/output (I/O) operations on the virtual objects without further interaction with virtual object device server 1070. Each OSD 1050 may include a corresponding OSD processor 1010, an OSD RAM 1020 and a write-back cache 140. In the embodiment illustrated, OSD 1050A includes a collection of physical disks 110A-B, and OSD 1050B includes physical disks 110C-D. Device management software 130 may be executable via instructions stored within OSD RAM at each OSD.

In some embodiments, a virtual object device 1075 may support snapshot operations, other COW operations, or calculated redundancy mechanisms similar to those described earlier for block virtualization environments that may benefit from asynchronous reads of previous versions of updated data objects. Device management software 130 incorporated within a given OSD may provide the desired previous versions to a storage processing node such as second storage consumer 1001B, virtual object device server 1070 or device management software incorporated within a different OSD.

It is noted that various combinations of the different virtualization techniques described above may be employed within different embodiments of system 100. For example, in one embodiment, a single storage environment may employ host-based volume managers, virtualization switches, object storage devices, and other virtualization mechanisms, one or more of which may utilize the techniques for asynchronous provision of a previous version of a data block or object described above. In general, a virtual device server (for either block-based virtualization or object-based virtualization) may be any device or software module capable of providing virtualization functionality as described above, such as a server computer system, including one or more processors and one or more system memories.

While the technique of asynchronously providing a previous version of a data block to a second storage consumer has been described above in the contexts of parity computation and snapshot management, its use is not limited to those two contexts. The same technique, or variants thereof, may be employed in other embodiments of storage environments where the following conditions hold: first, that a write-back cache is available; and second, that there is a requirement for an operation of a previous version of the data block being updated. For example, some storage environments may be configured to provide a complete auditable history of the changes made to a given set of data objects or blocks, e.g., to log each version of a data block as it changes over time to support fine-grained recovery mechanisms. Such change histories may be maintained, while keeping update latencies acceptable, using the techniques described above.

In some embodiments, an indication as to whether a particular update request requires special handling (i.e., whether an asynchronous provision of the previous version of the data is required at a storage processing node) may be provided to device management software 130. For example, device management software 130 may be configured to handle I/O requests targeted at any of several storage devices, where some of the storage devices may be involved in a COW operation, while others are not. In one embodiment, device management software may provide a set of specific application programming interfaces (APIs) to be used by storage consumers 120 to indicate that the special handling is required for a given update. In one such embodiment, a storage consumer 120 may utilize one of the specific APIs to request a first update operation on a storage device 110 that requires special handling, and may utilize a normal or standard I/O API to request a second update operation that does not require special handling. In another embodiment, an indication that special handling may be required for a given update may be provided via a flag, a directive, or a tag passed to device management software 130 along with the update request, for example as part of an enhanced storage access protocol supported by storage servers 555. At least a portion of device management software 130 may also be incorporated within a virtual device server 525 in embodiments employing virtualization.

The scheduling of the provision of the previous version of a data block to storage processing node 125 may be triggered in a variety of ways in different embodiments. A cached version of an updated data block may be marked or tagged with an indication that it requires special handling before its previous version is overwritten. That is, in some embodiments write-back cache 140 may support a mechanism to distinguish data blocks that require the asynchronous provision of a previous version from those that do not require such special handling. A tag associated with the dirty data block may include an identification of the destination (i.e., storage processing node 125) to which the previous version may be sent.

In many storage environments employing write-back caches, a configuration parameter (e.g., a parameter called "max_dirty_percent") may be used to specify a maximum acceptable proportion of "dirty" data blocks within write-back cache 140. (A "dirty" data block may be defined as an updated data block in the cache that has not yet been written to the backing storage device. Once the data block has been written to the backing storage device, the copy that may remain in the cache may be considered a "clean" data block.) When the proportion of dirty data blocks within write-back cache 140 reaches the specified maximum, device management software 130 may be configured to write dirty data blocks to the backing storage device until the proportion of dirty data blocks reaches a desired value. The desired value to which the proportion of dirty data blocks may be reduced may be specified by a second configuration parameter (e.g., "dirty_percent_after_clean"). For example, if max_dirty_percent is set to a value of 80, and dirty_percent_after_clean is set to 40, device management software 130 may write enough dirty data blocks to a backing storage device to reduce the percentage of dirty data blocks from 80% to 40%. The dirty data blocks that require a read of the previous version and a provisioning of the previous version to a storage processing node 125 may be tagged as noted above, allowing device management software 130 to perform the required read and provisioning operations. In another embodiment, the dirty data blocks that require asynchronous reads may be handled independently from the other dirty data blocks: e.g., a configuration parameter specifying the maximum acceptable proportion of dirty blocks that require asynchronous reads (e.g., "max_async_dirty_writes") may be specified. Device management software 130 may schedule a set of write operations to a backing storage device when the proportion or number of "special" dirty blocks (i.e., those requiring asynchronous reads of their previous versions) reaches the specified threshold level, even if the overall percentage of dirty data blocks remains acceptable.

The storage processing node 125 that may require the previous version of an updated data block may explicitly request the previous version in some embodiments. For example, in the distributed virtual RAID-5 device described above, space taken up by the new version of data stripe unit A0 (sent to storage server 555B by volume consumer 620) within write-back cache 140B may have to be given up as the proportion of dirty blocks within cache 140B rises. If write-back cache 140B at storage server 555B is close to reaching its max_dirty_percent threshold, therefore, device management software 130B may send a request for the previous version of a data stripe unit A0 to device management software 130A, to allow the required parity computation to be completed before the new version of the data block is overwritten in cache 140B. Similarly, a storage processing node 125 that requires a previous version of a data block for a snapshot update operation may send a request to device management software 130 requesting that the previous version be provided.

It is noted that in providing the previous version of an updated data block to storage processing node 125, in some embodiments device management software 130 may be configured to search for a copy of the previous version within one or more caches, such as a read cache separate from write-back cache 140, and to read the previous version from a backing storage device only if a copy is not found in a cache. For example, if the previous version of the data block is present in write-back cache 140 or in a separate read cache when the updated request arrives from storage processing node 125, in some embodiments the previous version may be tagged (as "invalid", for example) but may still remain in the cache until it is overwritten. If the tagged previous version remains in the cache at the time when it is required at storage processing node 125, device management software 130 may obtain it efficiently from the cache instead of performing a read operation on a backing storage device.

A storage consumer 120 may be any type of application or device, external to a given storage device 110 and its front-end write-back cache 140, that is capable of interacting with the given storage device 110 for data storage and retrieval. Thus, for example, firmware used within a hardware RAID device would not be considered a storage consumer for the hardware RAID device. In contrast, both a database application requesting an update on the hardware RAID device, and a replication application performing a snapshot update on a logical volume whose data is stored at the hardware device, would be considered storage consumers of the hardware RAID device. In one embodiment, a storage consumer may be an application hosted at a computer host connected to a storage device 110 via a network, where the network may form part of a LAN, a WAN, and/or a storage area network. A storage consumer 120 may also be hosted within a virtualization switch that may provide additional layers of virtualization on top of a logical volume 110. In other embodiments, a storage consumer 120 may be an embedded system configured to use application specific integrated circuit (ASIC) or field-programmable gate array (FPGA) technology to execute operations whereby a given storage device 110 may be accessed. Numerous other configurations of storage consumer 120 are possible and contemplated.

In different embodiments, device management software 130, storage consumers 120 and storage processing nodes 125 may be provided to a computer system using a variety of computer-accessible media including electronic media (e.g., flash memory), magnetic media such as RAM (e.g., SDRAM, RDRAM, SRAM, etc.), optical storage media such as CD-ROM, etc., as well as transmission media or signals such as electrical, electromagnetic or digital signals, conveyed via a communication medium such as a network and/or a wireless link. It is also noted that a write-back cache 140 may be implemented using a variety of media such as various forms of RAM (e.g., SDRAM, RDRAM, SRAM, etc.).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a storage device;
   a storage consumer configured to generate update requests to write data blocks to the storage device;
   a write-back cache configured to temporarily store the data blocks in response to the update requests generated by the storage consumer;
   a storage processing node; and
   device management software stored on a storage medium and executable to communicate with the storage consumer and the write-back cache,
   wherein the device management software is further executable to:
   store a new version of a first data block of the storage device in the write-back cache in response to a first update request from the storage consumer, wherein the new version of the first data block is provided by the storage consumer;
   send an update completion notification corresponding to the first update request to the storage consumer;
   read a previous version of the first data block from the storage device and provide the previous version of the first data block to the storage processing node in response to a detection that the write-back cache has reached a first threshold level of dirty data blocks after the update completion notification has been sent to the storage consumer and before the new version of the first data block is stored in the storage device; and
   overwrite the previous version of the first data block in the storage device with the new version of the first data block after the update completion notification has been sent to the storage consumer and after the previous version of the first data block is provided to the storage processing node.

2. The system as recited in claim 1, wherein the write-back cache is a non-volatile write-back cache.

3. The system as recited in claim 1, wherein the storage device is a file server.

4. The system as recited in claim 1, wherein the storage device is a logical volume.

5. The system as recited in claim 1, wherein the storage device is a physical disk.

6. The system as recited in claim 1, wherein the storage device is a disk array.

7. The system as recited in claim 1, wherein the storage device is an object storage device.

8. The system as recited in claim 1, wherein the storage processing node is configured to store the previous version of the first data block as part of a copy-on-write (COW) operation.

9. The system as recited in claim 1, wherein the storage processing node is configured to use the previous version of the first data block to maintain a snapshot of contents of the storage device.

10. The system as recited in claim 1, wherein the device management software is executable to provide the previous version of the data block to the storage processing node in response to a request from the storage processing node.

11. The system as recited in claim 1, wherein the first threshold level of dirty data blocks is specified by a first configuration parameter, and wherein the device management software is further executable to write dirty data blocks from the write-back cache to the storage device in response to the detection that the write-back cache has reached a first threshold level of dirty data blocks until a number of remaining dirty data blocks is reduced to a level specified by a second configuration parameter.

12. The system as recited in claim 1, wherein the storage processing node is configured to implement RAID functionality whereby a new parity block is computed by performing an XOR operation on the previous version of the first data block, the new version of the first data block, and a previous version of the parity block.

13. A computer-accessible storage medium for use with a computer system including a storage device, a storage consumer configured to generate update requests to write data blocks to the storage device, a write-back cache configured to temporarily store the data blocks in response to the update requests generated by the storage consumer, and a storage processing node, wherein the storage medium stores program instructions executable to:
   store a new version of a first data block of the storage device in the write-back cache in response to a first update request from the storage consumer, wherein the new version of the first data block is provided by the storage consumer;
   send an update completion notification corresponding to the first update request to the storage consumer;
   read a previous version of the first data block from the storage device and provide the previous version of the first data block to the storage processing node in response to a detection that the write-back cache has reached a first threshold level of dirty data blocks after the update completion notification has been sent to the storage consumer and before the new version of the first data block is stored in the storage device; and
   overwrite the previous version of the first data block in the storage device with the new version of the first data block after the update completion notification has been sent to the storage consumer and after the previous version of the first data block is provided to the storage processing node.

14. The computer-accessible storage medium as recited in claim 13, wherein the write-back cache is a non-volatile write-back cache.

15. The computer-accessible storage medium as recited in claim 13, wherein the storage device is a file server.

16. The computer-accessible storage medium as recited in claim 13, wherein the storage device is a logical volume.

17. The computer-accessible storage medium as recited in claim 13, wherein the storage device is a physical disk.

18. The computer-accessible storage medium as recited in claim 13, wherein the storage device is a disk array.

19. The computer-accessible storage medium as recited in claim 13, wherein the storage device is an object storage device.

20. The computer-accessible storage medium as recited in claim 13, wherein the storage processing node is configured to store the previous version of the first data block as part of a copy-on-write (COW) operation.

21. The computer-accessible storage medium as recited in claim 13, wherein the storage processing node is configured to use the previous version of the first data block to maintain a snapshot of contents of the storage device.

22. The computer-accessible storage medium as recited in claim 13, wherein the program instructions are executable to provide the previous version of the data block to the storage processing node in response to a request from the storage processing node.

23. The system as recited in claim 11, wherein selected ones of the dirty data blocks are each associated with a special tag in the write-back cache to indicate particular handling is required prior to an overwrite, wherein the device management software is further executable to detect the special tag associated with each of the selected ones of the dirty data blocks and to responsively provide a previous version of each of the selected ones of the dirty data blocks to the storage processing node prior to writing each of the selected ones of the dirty data blocks to the storage device.

24. The computer-accessible storage medium as recited in claim 13, wherein the first threshold level of dirty data blocks is specified by a first configuration parameter, and wherein the program instructions are further executable to write dirty data blocks from the write-back cache to the storage device in response to the detection that the write-back cache has reached a first threshold level of dirty data blocks until a number of remaining dirty data blocks is reduced to a level specified by a second configuration parameter.

25. A method for operating a computer system including a storage device, a storage consumer configured to generate update requests to write data blocks to the storage device, a write-back cache configured to temporarily store the data blocks in response to the update requests generated by the storage consumer, and a storage processing node, wherein the method comprises:

storing a new version of a first data block of the storage device in the write-back cache in response to a first update request from the storage consumer, wherein the new version of the first data block is provided by the storage consumer;

sending an update completion notification corresponding to the first update request to the storage consumer;

reading a previous version of the first data block from the storage device and providing the previous version of the first data block to the storage processing node in response to a detection that the write-back cache has reached a first threshold level of dirty data blocks after the update completion notification has been sent to the storage consumer and before the new version of the first data block is stored in the storage device; and overwriting the previous version of the first data block in the storage device with the new version of the first data block after the update completion notification has been sent to the storage consumer and after the previous version of the first data block is provided to the storage processing node.

26. The method as recited in claim 25, wherein the write-back cache is a non-volatile write-back cache.

27. The method as recited in claim 25, wherein the storage device is a file server.

28. The method as recited in claim 25, wherein the storage device is a logical volume.

29. The method as recited in claim 25, wherein the storage device is a physical disk.

30. The method as recited in claim 25, wherein the storage device is a disk array.

31. The method as recited in claim 25, wherein the storage device is an object storage device.

32. The method as recited in claim 25, wherein the storage processing node is configured to store the previous version of the first data block as part of a copy-on-write (COW) operation.

33. The method as recited in claim 25, wherein the storage processing node is configured to use the previous version of the first data block to maintain a snapshot of contents of the storage device.

34. The method as recited in claim 25, further comprising providing the previous version of the data block to the storage processing node in response to a request from the storage processing node.

35. The computer-accessible storage medium as recited in claim 24, wherein selected ones of the dirty data blocks are each associated with a special tag in the write-back cache to indicate particular handling is required prior to an overwrite, wherein the program instructions are further executable to detect the special tag associated with each of the selected ones of the dirty data blocks and to responsively provide a previous version of each of the selected ones of the dirty data blocks to the storage processing node prior to writing each of the selected ones of the dirty data blocks to the storage device.

* * * * *